April 14, 1964     H. FAURE     3,128,613
UNIVERSAL BALL JOINT

Filed Oct. 16, 1961     2 Sheets-Sheet 1

INVENTOR
*HENRY FAURE*

BY *Karl W. Flocks*

*ATTORNEY*

April 14, 1964     H. FAURE     3,128,613
UNIVERSAL BALL JOINT

Filed Oct. 16, 1961     2 Sheets-Sheet 2

INVENTOR
HENRY FAURE

BY Karl W. Flocks

ATTORNEY

United States Patent Office 3,128,613
Patented Apr. 14, 1964

3,128,613
UNIVERSAL BALL JOINT
Henry Faure, 13 Rue de Balzac, Saint-Etienne,
Loire, France
Filed Oct. 16, 1961, Ser. No. 145,075
Claims priority, application France Feb. 2, 1961
1 Claim. (Cl. 64—21)

The present invention relates to a universal ball joint of the integral diametral drive type.

Many universal ball joints exist, but they have one or more of the following drawbacks:
They are not rigorously homokinetic,
Their operation is not symmetric, thereby the balls and their races wear unequally,
They include many parts which are difficult to machine or to mount.

The present invention relates to a joint having none of the aforesaid drawbacks in the sense that it is rigorously homokinetic; that the wear of the balls and the races is rigorously symmetric; that the components thereof are easy to machine, are of limited number and of ready assembly; that, finally, it has the advantage of being noiseless.

The joint according to the invention is of the type wherein a torque is transmitted between two heads, male and female, by means of balls engaged within races, an intermediate cage providing the lateral link-up of these balls.

This joint is characterized essentially by the fact that the races of the same head are always inclined by the same angle and in the same direction with respect to the axis of revolution of the head under consideration, whilst the races of the other head are inclined with respect to the axis of revolution of this latter but in the inverse or opposite direction, and by the fact that the intermediate cage adapts itself exactly to the male head and then the female head and is provided with slots of oblong shape holding the balls laterally but allowing them a relative displacement in the rotational and radial directions.

Other features and advantages of the present invention will become clear from the following description in connection with the accompanying drawings giving, merely by way of explanation and without any intention of limitation, various embodiments of the invention.

Figure 1:
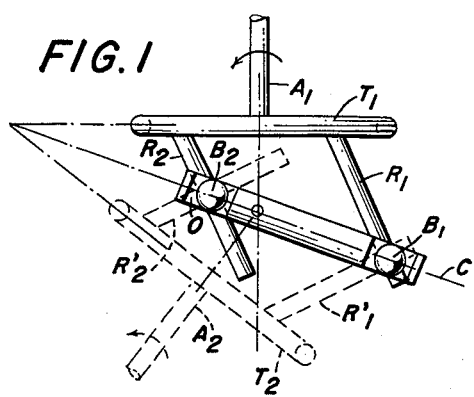
FIGURES 1 and 2 represent the general working diagram, in two different positions, of a joint whose races are inclined in the same direction for each head.
Figure 2:
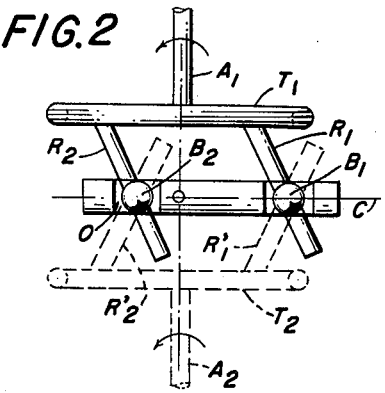
Figure 3:
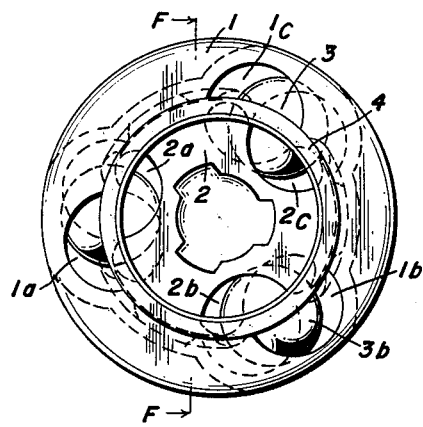
FIGURE 3 is a front view of a first embodiment of a joint according to the invention.
Figure 4:
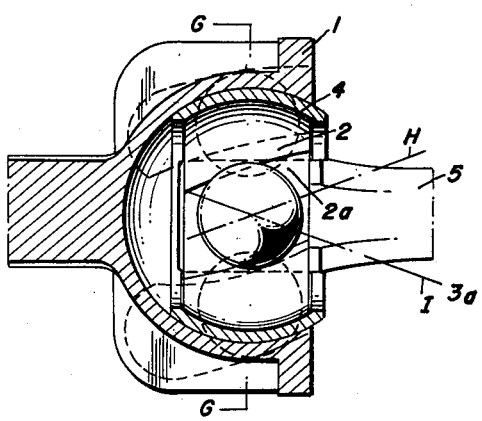
FIGURE 4 is a side view of the joint shown in FIGURE 3, the outer head and the cage being shown in section.
Figures 5, 6:
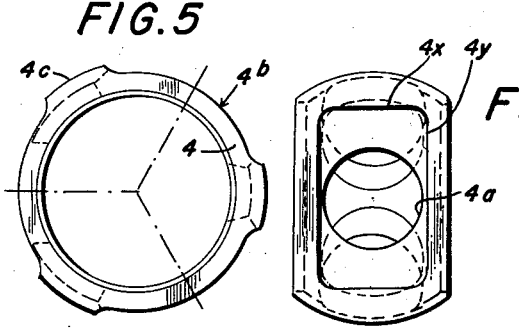
FIGURE 5 is a front view of the cage of the joint shown in FIGURES 3 and 4.
FIGURE 6 is a side view of the same cage.

In FIGURES 1 and 2 are illustrated the geometrical diagram of a joint according to the invention in two different positions, which show how the balls and the cage are restricted to a constant position in the bisecting plane, by orienting inversely each of the races housing a ball, in such a way that the latter is subjected to "scissoring" in the bisecting plane.

In these figures:

A1, A2 are the two axes of rotation,
T1, T2 are the two heads,
R1, R2, R′1, R′2 are the races distributed over the periphery of each of the heads,
C is the track of the cage of which O represents the oblong slots,
B1, B2 are the balls.

It can be seen in these figures that on the same head the adjacent races R1, R2 have the same inclination. The same is true for the races R′1, R′2 of the opposed head, but the various races confronting one another are inversed. FIGURE 1 illustrates the diagram wherein the two axes A1, A2 are extensions of each other, whereas in FIGURE 2 these axes form a certain angle. It can accordingly be seen that the track of the medial plane C of the cage always coincides with the bisecting plane, as the balls cannot have any lateral displacement in the slots.

FIGURES 3 to 6 illustrate a first embodiment of a joint according to the invention, wherein the longitudinal position of the head 1 and of the head 2 is invariable with respect to the geometric centre of the joint or even with respect to its bisecting plane G/G; to this end, the heads 1 and 2 as well as the cage 4 include spherical portions concentric with the geometric centre of the joint on which they are reciprocally engaged and play. The head 1 has three races 1a, 1b and 1c to which there correspond three races, 2a, 2b and 2c of the head 2; an angle I is given to the races of head 1 and an angle H is given to the races of head 2; each race of one head intersects a race of the other head on the bisecting plane G/G, this intersection, seen in plan, taking place at the geometric centre of the joint. With similar orientation of the angle of each of the races of one head, the lateral thrust of the balls 3, 3a and 3b takes place in the same direction and, in accordance with the direction of rotation of the joint, is either to the right or to the left of the bisecting plane G/G. The cage 4, centered by the spherical portion of the heads 1 and 2 on the one hand, and urged by the balls in the "scissored" position on the other hand, is, by virtue of these two conjugate actions, constantly balanced in the bisecting plane G/G.

The cage 4 is specially arranged to remain noiseless and, for this purpose, an opening 4a (FIGURE 6) is made of circular shape so that the ball 3a, which is housed therein with sufficient play for its axial clearance, centres the cage in the direction of rotation, this device not depriving the other balls of the play they must have in their slots 4x elongated to this effect, but preventing them from abutting the ends 4y of said slots.

In order to effect the insertion of the cage 4 into the head 1, relieved portions 4b (FIGURE 5) are provided of a diameter smaller than that of the entry of the inner spherical portion of head 1. The mounting of the components of the joint is effected in the following manner: the head 2 is engaged into the cage 4 and the unit thus formed is positioned in front of the head 1 (the projections 4c—FIGURE 5—being located to confront the races) and then fully inserted and rotated to engage the spherical portions of the head and the cage, the one in the other; the cage is then tilted to the maximum and the balls are introduced one by one; the shaft 5 is force-fitted into the head 2 and then locked by conventional means. Since the shaft 5 limits the oscillation of the cage 4, the balls accordingly can no longer disengage from the device.

Figure 7:
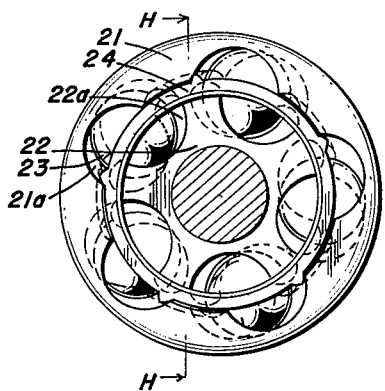
FIGURE 7 is a front view of a second embodiment of a joint according to the invention.
Figure 8:
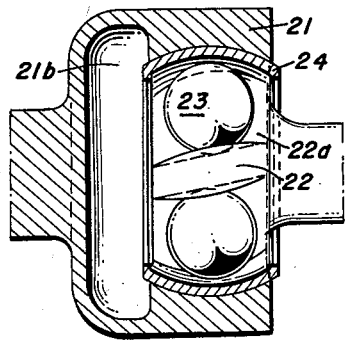
FIGURE 8 is a partly-sectional side view of the joint of FIGURE 7.

FIGURES 7 and 8 illustrate a second embodiment of a ball joint according to the invention, wherein the longitudinal position of the head 21 and of the head 22 is invariable with respect to the geometric centre of the joint, these heads, as well as the cage 24, including spherical parts by means of which they are engaged into one another.

Slightly different from the joint of FIGURES 3 to 6, the present embodiment includes a larger number of balls 23 and its races 21a give onto a relieved portion 21b. The mounting of the components of this device is carried out in the same manner as that described for the preceding joint.

Figure 9:
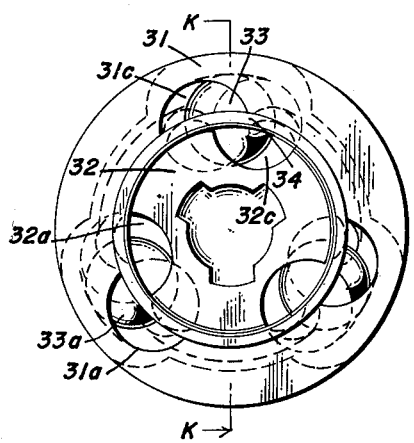
FIGURE 9 is a front view of a third embodiment of a joint according to the invention.
Figure 10:
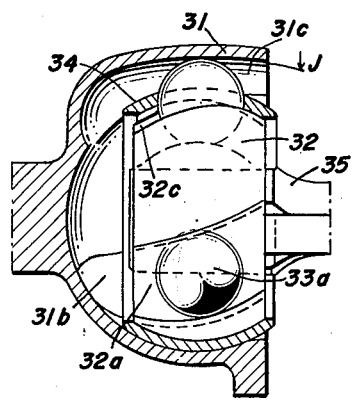
FIGURE 10 is a side view of the joint shown in FIGURE 9, the outer head and the cage being shown in section.

FIGURES 9 and 10 illustrate a third embodiment of a joint according to the invention, wherein the longitudinal position of the head 31 and of the head 32 is invariable as in the two preceding joints. As difference, the races 31a, 31b and 31c of head 31 and their corresponding races in head 32 have a curvi-linear shape, shown at J, whose centre of curvature is located outwith the geometric centre of the joint. The races can also have the shape of a meridian whose axis passes through the geometric centre of the joint. The mounting of the components of this device is carried out in the same manner as that described for the two preceding joints.

The operation of each of the embodiments having been described above, it will be seen that the balls enable constant equilibrium to be obtained, thus ensuring equal wear for all the balls.

It will be seen from the figures and the foregoing description that the number of parts required to form such a joint is relatively small when compared with that required for known ball joints and, above all, that their machining is less costly.

The scope of the invention is not exceeded by using equivalent means to form a homokinetic joint comprising the combination of two heads, male and female, having races subjecting the balls to "scissoring," and an intermediate cage provided with elongated peripheral orifices or slots for the balls, these orifices being such that only peripheral displacement of the balls is possible.

Thus, for example,

One of the shafts or both shafts can be removable from their respective heads;

The arrangement for securing the inner head onto its shaft can be of any type whatever;

The inner and outer profiles of the heads and cages can be of any design whatever provided that the friction surfaces be of revolution and conjugated;

The races can have a semi-circular cross-section of any diameter, provided that these diameters are adapted to the diameters of the balls or vice versa;

Casings in metal or in a flexible material can be provided to hold the lubricant in the components of the joint;

The races can be inclined by any angle, both on the diametral plane and in the longitudinal direction, provided that, as a function of the diameter of the balls, sufficient "scissoring" effect be obtained, and provided that two opposite races on the two opposite heads "scissoring" the same ball be symmetrically inclined in the inverse direction to each other;

The materials used for the various components can be of any desired type, as long as they are adapted to roll well and have little wear;

The renovation of these joints is easy since it suffices merely to rectify the races and to replace the balls.

I claim:

A homokinetic universal joint comprising, in combination, a female head having a spherical internal surface, a plurality of rectilinear ball races formed in said spherical internal surface and uniformly distributed about said internal surface, a male head having a spherical external surface, a plurality of ball races formed in said spherical external surface and uniformly distributed about said external surface intersecting and oppositely inclined to the races of said female head, a plurality of balls equal in number to the number of corresponding pairs of ball races with each of said balls being engaged simultaneously with a ball race of the male head and a corresponding ball race in the female head and adapted to transmit a mechanical couple between said male and female heads, and a single piece intermediate cage of spherical shape adapted to fit over said male head and within said female head, said cage having a plurality of slots of oblong shape adapted to hold said balls laterally but allow them a relative displacement in the rotational and radial directions, and at least one slot of circular shape adapted to receive one of said balls whereby said intermediate cage is centered in the direction of rotation with respect to said balls and said balls are subjected to a scissoring effect and their geometric center as well as the plane of symmetry of the cage are maintained constantly in the plane bisecting the axes of revolution of the male and female heads.

References Cited in the file of this patent

UNITED STATES PATENTS

| | | |
|---|---|---|
| 1,916,442 | Rzeppa | July 4, 1933 |
| 2,047,660 | Anderson | July 14, 1936 |
| 2,321,448 | Anderson | June 8, 1943 |
| 2,322,570 | Dodge | June 22, 1943 |
| 2,875,600 | Miller | Mar. 3, 1959 |
| 2,949,022 | Leon | Aug. 16, 1960 |
| 3,002,364 | Bellomo | Oct. 3, 1961 |